(12) United States Patent
Ohmura et al.

(10) Patent No.: US 7,150,939 B2
(45) Date of Patent: Dec. 19, 2006

(54) SURFACE-TREATED STEEL SHEET FOR BATTERY CONTAINER, A BATTERY CONTAINER, AND A BATTERY USING SAME

(75) Inventors: Hitoshi Ohmura, Yamaguchi-ken (JP); Tatsuo Tomomori, Yamaguchi-ken (JP); Hideo Ohmura, Yamaguchi-ken (JP); Keiji Yamane, Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 517 days.

(21) Appl. No.: 10/310,030

(22) Filed: Dec. 5, 2002

(65) Prior Publication Data

US 2003/0077510 A1    Apr. 24, 2003

Related U.S. Application Data

(63) Continuation of application No. 09/462,253, filed as application No. PCT/JP98/03056 on Jul. 7, 1998, now abandoned.

(30) Foreign Application Priority Data

Jul. 8, 1997    (JP) .................................. 9/196370

(51) Int. Cl.
*H01M 2/02* (2006.01)
*B32B 15/18* (2006.01)
*C25D 3/56* (2006.01)
*C25D 5/26* (2006.01)

(52) U.S. Cl. ...................... 429/176; 428/679; 205/258; 427/123; 427/405

(58) Field of Classification Search .................... None
See application file for complete search history.

(56) References Cited

U.S. PATENT DOCUMENTS 6,087,040 A * 7/2000 Ohmura et al. ............. 429/176
6,261,718 B1 * 7/2001 Ohmura et al. ............. 429/176
6,270,922 B1 * 8/2001 Ohmura et al. ............. 429/176

FOREIGN PATENT DOCUMENTS

| JP | 58-42164 | * | 3/1983 |
| WO | WO 97/42667 | * | 11/1997 |
| WO | WO 98/10475 | * | 3/1998 |

* cited by examiner

*Primary Examiner*—Jonathan Crepeau
(74) *Attorney, Agent, or Firm*—Browdy and Neimark, PLLC

(57) ABSTRACT

A battery container having an inner surface provided with a nickel-phosphorous alloy layer, optionally provided with a nickel-cobalt alloy layer as the lower layer thereof. The outer surface of the battery container is preferably provided with a nickel-cobalt alloy layer. Batteries made using the battery containers of the present invention have excellent performance.

2 Claims, No Drawings

SURFACE-TREATED STEEL SHEET FOR BATTERY CONTAINER, A BATTERY CONTAINER, AND A BATTERY USING SAME

This is a continuation of parent application Ser. No. 09/462,253 filed Mar. 27, 2000 now abandoned, nationalized Jan. 6, 2000, of which the international application PCT/JP98/03056 was filed Jul. 7, 1998.

TECHNICAL FIELD

The present invention relates to a surface-treated steel sheet for use in a battery container, a battery container, and a battery using it.

BACKGROUND ART

Battery containers for batteries such as a primary battery like alkali-manganese battery, a secondary battery like nickel-cadmium battery, and a nickel-hydrogen battery, which is expected to be increasingly demanded as a new secondary battery, should be filled with a strong alkaline solution. They have been conventionally manufactured by a so-called after-plating method in which a cold rolled steel sheet is press-formed and subjected to a barrel plating or by a so-called prior-plating method in which a nickel plated steel sheet is pressed and formed into a battery container. Many proposals for improvement in these methods have been made, among which the present inventors have proposed an excellent surface-treated steel sheet used for a battery container with a low internal resistance. (International Publication No. WO95/11527)

Further, in recent years, as the press-forming method for manufacturing a battery container, DI (Drawing and Ironing) forming method has taken the place of the multi-step deep drawing method since DI forming method enables the container to be much more thinned so as to achieve an increased capacity of the battery (Publication of Patent applications No. HEI-7-99686). These DI forming method and DTR (Drawing Thin and Redrawing) forming method are advantageous, because they enable a battery container to be so formed so that the thickness of the side wall is thinner than that of the bottom portion. Accordingly, much more anode and cathode electrode active materials can be packed into the container so as to attain increased battery capacity and also attain enhanced pressure-proof strength of the battery because of a rather large thickness of the bottom portion of the container.

The DI forming method and DTR forming method are effective in achieving the increase in the battery capacity as mentioned above. However, as for the formability of a container, they have a disadvantage in the continuous formability because a material subjected to these forming methods has a greater deformation resistance compared with that used in the conventional multi-step deep drawing method.

More specifically, in a case where the material is inferior in the anti-powdering properties (the properties of a plating layer against being peeled off in a powdery state) when subjected to the cupping operation in the DI forming method or DTR forming method, the peeled-off powder will adhere to a die and punch during the ironing operation, with the result that the container suffers flaws on the side wall thereof. This happens in the deep drawing forming in the same way. Though, in the cases of the DI forming method and DTR forming method, the obtained container has a side wall having a small surface roughness and glossier appearance, so the above mentioned flaws appear rather conspicuous. Thus, the anti-powdering properties of a material is more significant in the cases of the DI forming method and DTR forming method. In addition, in the cases of the DI forming method and DTR forming method, the material and tools come into contact with each other at a higher contact pressure compared with that in the case of deep drawing method. Therefore, the material is required to have excellent smoothness in view of the lifetime of the tools. Thus, a material excellent in the anti-powdering properties is required to be used as a battery container.

However, the conventionally used material sheet has the surface to be the outer surface of a battery container provided with a bright nickel plating. This bright nickel plating has a problem that it shows poor anti-powdering properties when subjected to press-forming. Another problem is that the bright nickel plating includes sulfur-containing organic additives (sulfonic acid comprising a=C—SO2-group, for example) for micronizing electrodeposited crystal particles and this sulfur is adsorbed in the plating layer during the electrodeposition. When the material sheet is subjected to ironing and stretching in the DI forming process or DTR forming process, the temperature of the material is raised, which increases the brittleness of the plating layer due to sulfur. As a result, the anti-powdering properties of the material is further deteriorated.

With a view to solving the above mentioned problem, it is an object of the present invention to provide a battery container, of which the inner surface has a surface-treated layer having low internal resistance and of which the outer surface has a surface-treated layer of high quality and excellent in continuous formability.

It is also a technological object to provide a surface-treated steel sheet suitably used for forming the battery container.

It is a further technological object to improve the ability of a formed container to be pulled off from a punch (strippability) after DI forming or DTR forming. This is considered since the degree of difficulty in removing a formed container from the punch (strippability) in the final operation of the press-forming process is important in addition to the above mentioned anti-powdering properties. When being pulled off from the punch, the formed container has its end portion hooked to be removed from the punch. And when the container has poor strippability, it will frequently suffer breaks or tears at the end portion thereof, which may lower the productivity of the container.

DESCLOSURE OF OF THE INVENTION

A battery container of the present invention is caracterised, of which the inner surface is provided with a nickel-phosphorous alloy layer.

A battery container of the present invention is caracterised, of which the inner surface is provided with a nickel-phosphorous alloy layer and the outer surface of which is provided with a nickel-cobalt alloy layer.

A battery container of the present invention is caracterised, of which the inner surface is provided with a nickel-phosphorous alloy layer and the outer surface of which is provided with an upper layer formed of a nickel-cobalt alloy and a lower layer formed of a nickel-phosphorous alloy.

A battery container of the present invention is caracterised, wherein the cobalt content in the nickel-cobalt alloy layer of said outer surface of the battery container is within the range of 0.1 to 1.0 wt %.

A battery container of the present invention is caracterised, of which the inner surface is provided with an upper layer formed of a nickel-phosphorous alloy and a lower layer formed of a nickel-cobalt alloy, and the outer surface is provided with an upper layer formed of a nickel-cobalt alloy and a lower layer formed of a nickel-cobalt alloy.

A battery container of the present invention is caracterised, wherein the cobalt content in the nickel-cobalt alloy forming the lower layer of said outer surface of the battery container is within the range of 0.1 to 1.0 wt % and the cobalt content in the nickel-cobalt alloy layer of said inner surface of the battery container is within the range of 1.0 to 2.0 wt %.

A battery container of the present invention is caracterised, of which is obtained by the drawing forming method, DI forming method or DTR forming method.

A battery container of the present invention is caracterised, wherein the phosphorous content in said nickel-phosphorous alloy layer is within the range of 0.1 to 1.0 wt %.

A battery container of the present invention is caracterised, wherein the thickness of said nickel-phosphorous alloy layer is within the range of 0.1 to 4.0 μm.

A battery container of the present invention is caracterised, wherein the thickness of said nickel-cobalt alloy layer is within the range of 0.1 to 2.0 μm.

A surface-treated steel sheet for use in a battery container of the present invention is caracterised, of which the side surface to be the inner surface of the battery container is provided with a nickel-phosphorous alloy layer.

A surface-treated steel sheet for use in a battery container of the present invention is caracterised, of which the side surface to be the inner surface of the battery container is provided with a nickel-phosphorous alloy layer, and the side surface to be the outer surface of the battery container is provided with a nickel-cobalt alloy layer.

A surface-treated steel sheet for use in a battery container of the present invention is caracterised, of which the side surface to be the inner surface of the battery container is provided with a nickel-phosphorous alloy layer, and the side surface to be the outer surface of the battery container is provided with an upper layer formed of a nickel-cobalt alloy and a lower layer formed of a nickel-phosphorous alloy.

A surface-treated steel sheet for use in a battery container of the present invention is caracterised, wherein the surface to be the inner surface of the battery container is provided with an upper layer formed of a nickel-phosphorous alloy layer and a lower layer formed of a nickel-cobalt alloy, and the surface to be the outer surface of the battery container is provided with an upper layer formed of a nickel-cobalt alloy and a lower layer formed of a nickel-cobalt alloy.

A surface-treated steel sheet for use in a battery container of the present invention is caracterised, wherein the phosphorous content in said nickel-phosphorous alloy layer is within the range of 0.1 to 1.0 wt %.

A surface-treated steel sheet for use in a battery container of the present invention is caracterised, wherein the cobalt content in the nickel-cobalt alloy layer of the side surface to be the outer surface of the battery container is within the range of 0.1 to 1.0 wt %.

A battery container or a surface-treated steel sheet for use in a battery container of the present invention is caracterised, wherein the cobalt content in the nickel-cobalt alloy forming the lower layer of said outer surface is within the range of 0.1 to 1.0 wt % and the cobalt content in the nickel-cobalt alloy forming the lower layer of said inner surface is within the range of 1.0 to 2.0 wt %.

A surface-treated steel sheet for use in a battery container of the present invention is caracterised, wherein the thickness of said nickel-phosphorous alloy layer is within the range of 0.1 to 4.0 μm.

A surface-treated steel sheet for use in a battery container of the present invention is caracterised, wherein the thickness of said nickel-cobalt alloy layer is within the range of 0.1 to 2.0 μm.

A battery using a battery container of the present invention is caracterised, wherein the battery container is packed with a positive electrode active material and a negative electrode active material.

A manufacturing method for a surface-treated steel sheet for use in a battery container of the present invention is caracterised, wherein a nickel-phosphorous alloy plating is applied to the steel sheet surface to be the inner surface of the battery container.

A manufacturing method for a surface-treated steel sheet for use in a battery container of the present invention is caracterised, wherein a nickel-phosphorous alloy plating is applied to the steel sheet surface to be the inner surface of the battery container and a nickel-cobalt alloy plating is applied to the other surface of the steel sheet to be the outer surface of the battery container.

A manufacturing method for a surface-treated steel sheet for use in a battery container of the present invention is caracterised, wherein a nickel-phosphorous alloy plating is applied to the steel sheet surface to be the inner surface of the battery container and a nickel-cobalt alloy plating is applied to the other surface of the steel sheet to be the outer surface of the battery container.

A manufacturing method for a surface-treated steel sheet for use in a battery container of the present invention is caracterised, wherein a nickel-cobalt alloy plating is firstly applied to both surfaces of a steel sheet, subsequently a nickel-phosphorous alloy plating is applied to the plated steel sheet surface to be the inner surface of the battery container, and then a nickel-cobalt alloy plating is applied to the plated steel sheet surface to be the outer surface of the battery container.

BEST MODE FOR CARRYING OUT THE INVENTION

A surface-treated steel sheet according to the present invention is now explained. The surface-treated steel sheet of the present invention comprises surface-treated layers of different structures respectively for the surface to be the inner surface of a battery container and for the surface to be the outer surface of the battery container. To begin with, the first structure of the surface-treated layer of the steel sheet for the inner surface of the battery container is explained in detail.

In the first structure, a nickel-phosphorous alloy layer is formed on the surface of the steel sheet to be the inner surface of the battery container. This alloy layer on the inner surface of the battery container produces lower battery internal resistance so as to enhance the battery performance, for example, the lifetime of the battery. The nickel-phosphorous alloy layer is provided on the inner surface of the battery container also for another reason mentioned below. Recently, the developed can forming methods such as DI forming method or DTR forming method has made it possible to decrease the thickness of a can body. At the same time, a battery employing such container of thinned can body uses a strong alkaline inner solution such as potassium hydroxide. Therefore, it is necessary for the inner surface of the battery which is exposed to such a strong alkaline solution to have a surface-treated layer further improved in the anti-corrosion properties than a metallic nickel layer.

When a nickel-phosphorous alloy layer is formed on a steel sheet by electroplating, the formed nickel-phosphorous alloy layer becomes amorphous and the anti-corrosion thereof increases in proportion to the phosphorous content. At the same time, however, the hardness of the plating layer increases in proportion to the phosphorous content. When the hardness of the plating layer excessively increases, the nickel-phosphorous plated inner surface of the container will suffer cracks during press-forming and the steel base of the container will be exposed, which adversely deteriorates the anti-corrosiveness of the container. Therefore, it is necessary to limit the phosphorous content to the range of 0.1 to 1.0 wt % so as to prevent the occurrence of the cracks during press-forming. Further, it is necessary for the nickel-phosphorous alloy layer to have a thickness of 0.1 to 4.0 μm. When the thickness of the nickel-phosphorous alloy layer is less than 0.1 μm, the effect of decreasing the battery internal resistance cannot be obtained. On the other hand, when the thickness is more than 4.0 μm, the effect of increasing the adhesion of this alloy layer to a positive electrode compound comes to saturation, which is uneconomical. Accordingly, when a layer of nickel-cobalt alloy is further formed as the lower layer of the nickel-phosphorous alloy layer, instead of forming a mono layer of nickel-phosphorous alloy on a steel sheet, the nickel-phosphorous alloy layer as the upper layer may have a thickness less than that mentioned above.

The nickel-phosphorous alloy layer may preferably be formed by electroplating using a Watt bath. The electroplating is practiced using the Watt bath comprising a water solution containing 100 to 350 g/l of nickel sulfate, 10 to 50 g/l of nickel chloride, and 5 to 40 g/l of phosphorous acid, under the conditions set at a bath temperature of 50 to 70° C., to pH of 0.5 to 1.5, and at a current density of 3 to 15A/dm$^2$.

Next, as the upper layer of the surface-treated layer of a steel sheet to be the outer surface of a battery container, a nickel-cobalt alloy layer is provided for the following reasons. That is, a nickel-cobalt alloy layer is excellent in the anti-powdering properties and also excellent in the formability in the DI forming operation and DTR forming operation compared with the conventional single layer of nickel plating. Incidentally, the nickel-cobalt alloy layer formed on the surface of a steel sheet to be the outer surface of a battery container may preferably be a bright plating layer. This is because the nickel-cobalt alloy layer has an excellent metallic gloss, which contributes to a higher commercial value of the batteries.

This bright plating is performed such that some amount of a brightening agent like a commercially-available brightener or saccharin is added to a bath composition for nickel-cobalt alloy plating.

Specifically, the nickel-cobalt alloy plating is performed such that cobalt sulfate is added to a nickel sulfamate bath so as to mingle cobalt into a nickel plating layer. More specifically, for example, the nickel-cobalt alloy plating is performed by the use of a bath composed of 400 to 800 g/l of nickel sulfamate, 5 to 10 g/l of nickel chloride, 1 to 30 g/l of cobalt sulfate, and 20 to 60 g/l of boric acid under the conditions set to pH of 4.0, at a temperature of 60° C. with air agitation, and at a current density of 10A/dm$^2$. As cathode, spherical nickels packed in a titanium basket and further lapped with a polypropylene bag is used.

The second structure of the plating according to the present invention comprises a surface of a steel sheet to be the inner surface of a battery container, which is provided with two layers of a nickel-phosphorous alloy layer (upper layer) and a nickel-cobalt alloy layer (lower layer) and the other surface of the steel sheet to be the outer surface of the battery container, which is provided with a lower layer of a non-bright nickel-cobalt alloy and an upper layer of a bright nickel-cobalt alloy.

The reason for the formation of such non-bright nickel-cobalt alloy layer (lower layer) on a battery container is as follows. Namely, it is necessary to prevent the steel base of the container from being directly exposed to the strong alkaline solution in the battery and prevent an occurrence of a serious trouble such as leakage of a battery solution, even when the upper layer of nickel-phosphorous alloy layer or nickel-cobalt alloy layer formed on the lower layer suffers cracks during press-forming. The reason for the alloy composition of nickel and cobalt is that the nickel-cobalt alloy is excellent in the anti-alkali-corrosion, it has an excellent elongation so that it is almost free from cracks at the time of press-forming, it includes the same nickel component as the upper layer so that it is excellent in the adhesion to both the steel base and the upper nickel-phosphorous alloy layer, and so on.

A nickel-cobalt alloy layer as an intermediate layer between the steel sheet and the upper layer may preferably be formed by a nickel-cobalt alloy plating. The nickel-cobalt alloy plating is performed such that cobalt sulfate is added to a nickel sulfamate bath so as to mingle the cobalt into a nickel plating layer. More specifically, for example, the nickel-cobalt alloy plating is performed by use of a bath composed of 400 to 800 g/l of nickel sulfamate, 5 to 10 g/l of nickel chloride, 1 to 30 g/l of cobalt sulfate, and 20 to 60 g/l of boric acid under the conditions set to pH of 4.0, at a temperature of 60° C. with air agitation, and at a current density of 10A/dm$^2$. As cathode, spherical nickels packed in a titanium basket and further lapped with a polypropylene bag may preferably be used.

As for the inner surface layer of the battery container according to the present invention, a cobalt content in the nickel-cobalt alloy layer may preferably be within the range of 0.1 to 4.0%. When the cobalt content is less than 0.1%, the anti-corrosion effect due to the presence of cobalt is lost, while when the cobalt content is more than 4.0%, it leads to an economical loss. The nickel-phosphorous alloy layer of this second structure is formed on the nickel-cobalt alloy layer, which has been formed in the manner as previously mentioned, under the same conditions as in the first structure. The above mentioned nickel-phosphorous alloy layer or the nickel-cobalt alloy layer may preferably have a thickness of 0.1 to 4.0 μm and more preferably 1.5 to 2.0 μm, respectively.

The manufacturing process of the surface-treated steel sheet according to the present invention is now explained with reference to FIG. b 1.

[Steel Sheet]

As a base sheet to be plated, a low carbon aluminum-killed steel is suitably used in general. Further, a non-ageing hyper-low carbon steel made of the low carbon aluminum-killed steel to which niobium, boron, or titanium is added is also used. Normally, such base sheet is prepared by subjecting a steel strip to the steps of electro-degreasing, annealing, and skin pass rolling after cold rolling.

[Nickel-Phosphorous Alloy Plating]

The above mentioned base sheet is subjected to a pre-treatment comprising the steps of alkaline electrolytic degreasing, rinsing, pickling by sulfuric acid or hydrochloric acid (electrolysis or immersion), and rinsing. Thereafter, the thus pretreated base steel sheet has one surface or both surfaces thereof provided with a nickel-phosphorous alloy plating. In the present invention, a plating bath for the nickel-phosphorous alloy plating may be any of known baths such as Watt bath, sulfamate bath, and chloride bath. When the above mentioned nickel-phosphorous alloy plating of the inner surface of the battery container has a thickness of less than 0.1 µm, the nickel-phosphorous alloy plating layer has a number of pinholes present therein. Accordingly, iron (of the base steel sheet) increasingly dissolves into the alkaline solution of the battery electrolyte, resulting in an increasing formation of an iron oxide, which is unfavorable. When the nickel-phosphorous alloy plating of the outer surface of the battery container has a thickness of less than 0.1 µm, such outer surface of the battery is inferior in corrosion resistance, which is also unfavorable.

Next, the formation of the nickel-phosphorous alloy plating and the nickel-cobalt alloy plating on the battery container or the surface-treated steel sheet as mentioned above is explained. The nickel-phosphorous alloy plating is performed by the Watt bath such that a phosphorous acid is added to the nickel plating bath. One specific example of such nickel-phosphorous alloy plating bath is such that 0.3 to 2.0 g/l of phosphorous acid as H3PO3 is quantity-variably added to a composition of 300 g/l of nickel sulfate (6 hydrated), 45 g/l of nickel chloride, and 40 g/l of boric acid so that the deposition amount of phosphorous in the nickel layer may be adjusted.

The nickel-phosphorous alloy plating bath may preferably have a temperature of 55 to 60° C. and pH up to 2.0 at most. In such a case, the thickness of the plating layer may preferably be 0.5 to 4.0 µm.

Further, the nickel-cobalt plating is performed also by the Watt bath such that cobalt sulfate is added to the nickel plating bath so that cobalt and nickel are co-electrodeposited to form a surface-treated layer.

[Description of Battery Container]

Next, the manufacture of a battery container using the above mentioned surface-treated steel sheet is explained.

The battery container according to the present invention is manufactured by forming the surface-treated steel sheet produced as above into a shape of cylinder using a press.

The inventors of the present invention have found that in a case where the above mentioned surface-treated steel sheet is used for manufacturing a battery container for an alkaline dry cell, a battery using this container can be provided with a more excellent battery performance than that using the conventional battery container.

[Structure of Outer Surface of Battery Container]

According to the present invention, it is preferred that the outermost layer of a surface-treated layer formed on the outer side of a battery container may be a bright nickel-cobalt alloy. This is because such bright nickel-cobalt alloy layer formed on the uppermost surface of the battery container effectively serves to suppress the powdering of the surface-treated steel sheet to a lower level than the single nickel plating layer of a conventional surface-treated steel sheet at the time of press-forming. In addition, it is also because the nickel-cobalt alloy layer has excellent anti-corrosion properties.

It is to be noted that according to the present invention, an intermediate layer of a non-bright nickel-cobalt alloy layer or a nickel-phosphorous alloy layer or the like can be provided under the bright nickel-cobalt alloy layer. Such intermediate layer serves to impart further improved corrosion resistance to the surface-treated steel sheet, which also provides an improvement in the corrosion resistance of the entire outside appearance of the battery container.

[Structure of Inner Surface of Battery Container]

According to the first embodiment of the present invention, a surface-treated layer of the inner surface of a battery container is formed of a nickel-phosphorous alloy.

According to the second embodiment of the present invention, a surface-treated layer of the inner surface of a battery container comprises an upper (outermost) layer formed of a nickel-phosphorous alloy and a lower layer formed of a nickel-cobalt alloy.

EXAMPLES

The present invention is explained more in detail in accordance with Examples.

Examples 1 to 6

A low carbon aluminum-killed steel sheet having a thickness of 0.25 mm which had been already cold rolled and annealed was used as a base steel sheet to be plated. The chemical composition of the base steel was as follows.

C: 0.04% (% means a percentage by weight, and the same hereinafter), Mn: 0.19%, Si: 0.01%, P: 0.012%, S: 0.009%, Al: 0.064%, and N: 0.0028%

The above mentioned steel sheet was subjected to alkali-electrolytic degreasing under the following conditions.

[Alkali-Electrolytic Degreasing]
　Electrolysis Condition
　Bath composition: 30 g/l of caustic soda
　Current density: 5A/dm$^2$ (anodic treatment)×10 seconds
　　5A/dm$^2$ (cathodic treatment)×10 seconds
　Bath temperature: 70° C.

Subsequently, the base steel sheet was subjected to sulfuric acid pickling (50 g/l of sulfuric acid, bath temperature of 30° C., immersion for 20 seconds). After that, a nickel-phosphorous alloy plating was applied to both surfaces of the thus pretreated base steel sheet under the following conditions.

[Nickel-Phosphorous Alloy Plating]
　Bath composition: 300 g/l of nickel sulfate
　　40 g/l of boronic acid
　　45 g/l of nickel chloride
　　0.5 g/l of sodium lauryl sulfate
　　10 g/l of phosphorous acid
　Bath temperature: 55±2° C.
　pH: 1.5 to 2.0
　Agitation: air agitation
　Current density: 10A/dm$^2$
　Anode: nickel pellets (nickel pellets packed in a titanium basket, which is then lapped with a polypropylene bag)

The nickel-phosphorous alloy plating to both surfaces of the steel sheet was performed under the above mentioned conditions and for a variable time of the electrolysis so as to obtain plating layers having varied thicknesses. Incidentally, there were also obtained samples each of which has plating layers different in thickness on both sides of the steel sheet.

[Nickel-Cobalt Alloy Plating]

After the nickel-phosphorous alloy plating, only the surface of the steel sheet to be the outer surface of a battery container was subjected to bright nickel-cobalt alloy plating. In this case, the nickel-cobalt alloy plating was performed in a Watt bath. Namely, cobalt sulfate was added to the Watt bath as follows so that a nickel plating layer might have a cobalt content.

Bath composition: 600 g/l of nickel sulfamate Ni(NH$_2$SO$_3$).4H$_2$O
10 g/l of nickel chloride NiCl$_2$.6H$_2$O
5 to 20 g/l of cobalt sulfate CoSO$_4$.6H$_2$O
40 g/l of boric acid H$_3$BO$_3$
pH: 4 (adjusted by sulfamine acid)
Agitation: air agitation
Bath temperature: 60° C.
Cathode current density: 10A/dm$^2$
Anode: S PELLETs (spherical shape, manufactured by INCO Corporation) packed in a titanium basket, which is then lapped with a polypropylene bag)

The nickel-cobalt alloy plating was performed under the above mentioned conditions, by variable amounts of cobalt sulfate to be added, and for variable time of the electrolysis so that the plating layers might have varied cobalt contents and varied thicknesses.

container under the same conditions as in Example 1 to produce a surface-treated steel sheet.

Comparative Examples

A nickel plating (not a nickel-phosphorous alloy plating) was applied to the surface of the base steel sheet to be the inner surface of a battery container under the following conditions.

[Nickel Plating]
Bath composition: 300 g/l of nickel sulfate
30 g/l of boric acid
45 g/l of nickel chloride
0.5 g/l of sodium lauryl sulfate
Bath temperature: 55±2° C.
pH: 4.0 to 4.5
Agitation: air agitation
Current density: 15A/dm$^2$ A reference material obtained from the above mentioned Examples and Comparative Examples is shown as Table 1.

TABLE 1

| Example Comparative Ex. | Ex. 1 | Ex. 2 | Ex. 3 | Ex. 4 | Ex. 5 | Ex. 6 | Ex. 7 | Ex. 8 | Ex. 9 | Ex. 10 | Comp. Ex. |
|---|---|---|---|---|---|---|---|---|---|---|---|
| kind of plating | Ni-P | Ni-P | Ni-P | Ni-P | Ni-P | Ni-P | Ni-P | Ni-P | Ni-P | Ni-P | Ni |
| plating layer thickness (μm) | 1.5 | 1.5 | 1.8 | 1.8 | 2.0 | 2.0 | 0.1 | 1.5 | 2.5 | 4.0 | 2.0 |
| P content (%) | 0.5 | 0.5 | 0.5 | 0.5 | 0.5 | 0.5 | 0.5 | 0.5 | 0.5 | 0.5 | — |
| kind of plating | — | — | — | — | — | — | Ni-Co | Ni-Co | Ni-Co | Ni-Co | — |
| plating layer thickness (μm) | — | — | — | — | — | — | 1.8 | 1.5 | 2.0 | 1.5 | — |
| content (%) | — | — | — | — | — | — | Co = 1.5 | Co = 1.0 | Co = 1.5 | Co = 2.0 | — |
| kind of plating | Ni-Co | Ni-Co | Ni-Co | Ni-Co | Ni-Co | Ni-Co | Ni-Co | Ni-Co | Ni-Co | Ni-Co | Ni-Co |
| plating layer thickness (μm) | 0.1 | 0.5 | 0.5 | 1.0 | 0.5 | 1.0 | 0.5 | 0.5 | 0.8 | 1.0 | 0.5 |
| content (%) | Co = 1.5 | Co = 1.5 | Co = 1.5 | Co = 1.5 | Co = 1.5 | Co = 1.5 | Co = 1.5 | Co = 1.5 | Co = 1.2 | Co = 1.6 | Co = 1.5 |
| kind of plating | Ni-P | Ni-P | Ni-P | Ni-P | Ni-P | Ni-P | Ni-Co | Ni-Co | Ni-Co | Ni-Co | Ni-Co |
| plating layer thickness (μm) | 1.5 | 1.5 | 1.5 | 1.5 | 1.5 | 1.5 | 1.5 | 1.5 | 1.0 | 1.8 | 1.5 |
| P or Co content (%) | P = 0.5 | P = 0.5 | P = 0.5 | P = 0.5 | P = 0.5 | P = 0.5 | Co = 0.5 | Co = 0.5 | Co = 0.2 | Co = 0.8 | Co = 1.5 |
| internal resistance to inner surface of surface of battery container (m Ohm) | 86 | 88 | 89 | 88 | 88 | 87 | 88 | 87 | 86 | 87 | 90 |
| duration till reaching 0.9 V by continuously discharging (min.) | 120 | 118 | 119 | 123 | 118 | 117 | 119 | 120 | 121 | 119 | 111 |

The thickness of the plating layers was measured by the ICP method.

Examples 7 to 10

The same steel sheet as in Example 1 was used as a base sheet and provided with the above mentioned nickel-cobalt alloy plating on both surfaces thereof. Then, another nickel-cobalt alloy plating was applied to one of the surfaces of the steel sheet to be the outer surface of a battery container under the same conditions as in Example 1 and subsequently a nickel-phosphorous alloy plating was applied to the other surface of the steel sheet to be the inner surface of the battery

[Manufacture of Battery Container]

According to the DI forming method, a battery container was manufactured by using the above mentioned surface-treated steel sheet having a thickness of 0.38 mm. That is, the surface-treated steel sheet of 41 mm in blank diameter was formed into a cup of 20.5 mm in diameter, which was then subjected to redrawing and two-step ironing by means of a DI forming machine to be formed into a container body having an outer diameter of 13.8 mm, a wall thickness of 0.20 mm, and a height of 56 mm. Finally, an upper end portion of the container body was trimmed to produce a battery container of LR6 type having a height of 49.3 mm.

According to the DTR forming method, a battery container was manufactured using the surface-treated steel sheet having a thickness of 0.25 mm. That is, the surface-treated steel sheet of 58 mm in blank diameter was formed by several times of drawing and redrawing into a LR6 type battery container having an outer diameter of 13.8 mm, a wall thickness of 0.20 mm and a height of 49.3 mm.

[Manufacture of Battery]

After the battery container was manufactured as mentioned above, an alkali-manganese battery of LR-6 type was manufactured in the following manner.

At first, manganese dioxide and graphite were compounded at a weight ratio of 10 manganese dioxide to 1 graphite, to which 8 mol potassium hydroxide was added to prepare a positive electrode compound. Then, the positive electrode compound was pressed in a mold under pressure to produce a doughnut-shaped pellet having a fixed size. The pellet was pressed into the battery container. Next, a negative electrode plate to which a negative electrode collecting bar was spot-welded was fixed to the battery container.

Subsequently, a separator made of non-woven vinylon cloth was inserted into the battery container along the inner periphery of the pellet which had been press-joined to the battery container. Then, a cathode gel of potassium hydroxide saturated with zinc particles and zinc oxide was filled into the battery container. Further, an insulating gasket was fixed to the negative electrode plate, which was inserted into the battery container. The battery container was then calked, thus producing an alkali-manganese battery as the finished product.

Incidentally, it is preferred that graphite may be applied to the inner surface of the battery container so as to improve the battery performance. In such case, 80 parts by weight of graphite is blended with 20 parts by weight of thermosetting epoxy resin diluted with methylethylketone, air-sprayed to the inner surface of the battery container, and dried at 150° C. for 15 minutes.

The thus manufactured batteries were each evaluated with regard to the battery performance. The evaluation results are shown in Table 1. It is to be noted that the measurement was repeated three times with respect to 30 containers as one measurement unit in every examination, since a single measurement for each container alone may lead a large difference.

In Table 1, Comparative Example is a case where a battery container is manufactured by using a surface-treated steel sheet, of which the surface to be the inner surface of the battery container is provided with a single plating layer of nickel and press-forming it. In contrast, Examples 1 to 6 are cases where battery containers are manufactured by using a surface-treated steel sheet, of which the surface to be the inner surface of the battery container is provided with a single plating layer of nickel-phosphorous alloy and press-forming it. Further, Examples 7 to 10 are cases where battery containers are manufactured by using a surface-treated steel sheet having a surface-treated layer comprising an upper layer of nickel-phosphorous alloy plating and a lower layer of nickel-cobalt alloy plating, and press-forming it.

These battery containers were each filled with the active material, thus producing batteries of LR-6 size. Each battery test piece was retained at a temperature of 60° C. for 20 days and then was determined with respect to duration (minute) till reaching the end voltage of 0.9V by continuously discharging at 2 Ohm. As a result, the duration of the batteries of Examples according to the present invention are longer than that of Comparative Example. Thus, it is clear that the alkaline battery manufactured by the surface-treated steel sheet of the present invention has superior performance.

The surface-treated steel sheet of the present invention can be suitably used in the conventional multi-step deep drawing method with improved battery performance, antipowdering property and scratch resistance as well as in DI forming method or DTR forming method for thinning the wall thickness of a battery container.

INDUSTRIAL APPLICABILITY

In a case where the surface-treated steel sheet of the present invention is used for forming a battery container such that its surface provided with the single layer of the nickel-phosphorous alloy plating or the combination layers of the nickel-phosphorous alloy plating and the nickel-cobalt alloy plating serves as a surface of the battery container exposed to the active material of a battery, it exhibits a more excellent effect in the battery performance compared with the case of using the conventional surface-treated steel sheet having a single nickel plating layer.

What is claimed is:

1. A manufacturing method for a surface-treated steel sheet for use in a battery container, wherein a nickel-phosphorous alloy electroplating is applied to the steel sheet surface to be the inner surface of the battery container and a nickel-cobalt alloy plating is applied to the other surface of the steel sheet to be the outer surface of the battery container.

2. A manufacturing method for a surface-treated steel sheet for use in a battery container, wherein a nickel-cobalt alloy electroplating is firstly applied to both surfaces of a steel sheet, subsequently a nickel-phosphorous alloy plating is applied to the plated steel sheet surface to be the inner surface of the battery container, and then a nickel-cobalt alloy plating is applied to the plated steel sheet surface to be the outer surface of the battery container.

* * * * *